Figure 5:
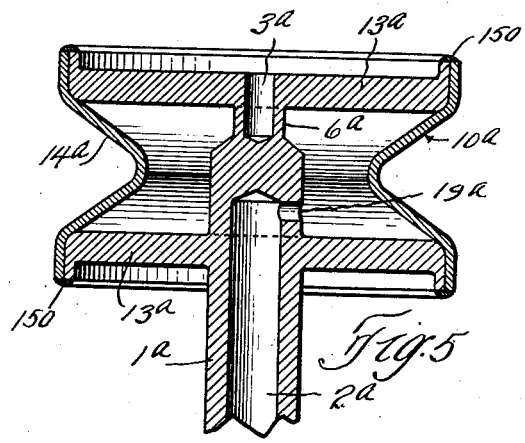

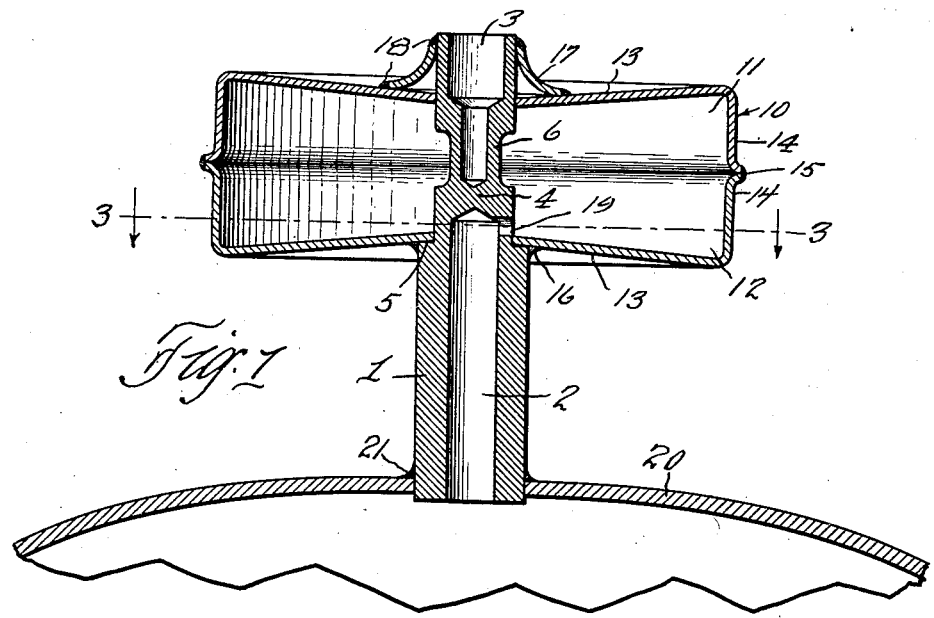
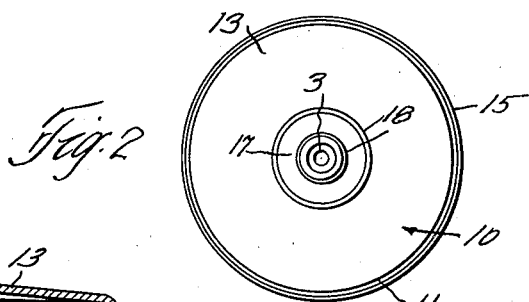
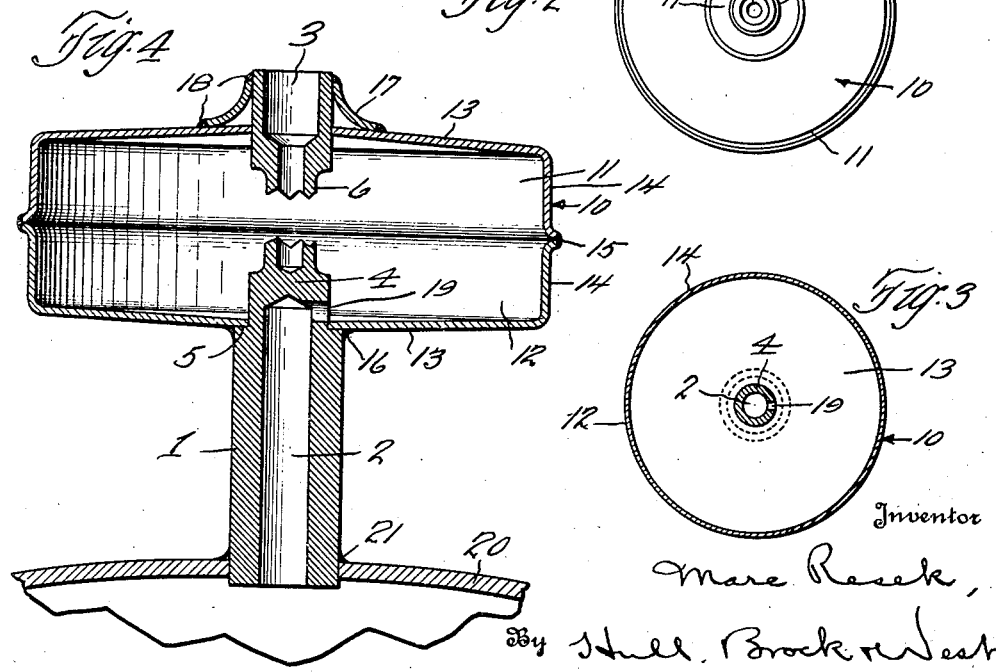

Patented May 17, 1932

1,858,280

UNITED STATES PATENT OFFICE

MARC RESEK, OF CLEVELAND HEIGHTS, OHIO, ASSIGNOR TO PERFECTION STOVE COMPANY, OF CLEVELAND, OHIO, A CORPORATION OF OHIO

SAFETY BLOW-OFF DEVICE

Application filed February 24, 1930. Serial No. 430,595.

This invention realtes to a safety blow-off device particularly adapted for use in conjunction with absorption refrigeration apparatus. Such apparatus is frequently characterized by an entire absence of mechanical parts and consequently can ordinarily be hermetically sealed, this usually being done by welding all parts of the apparatus together so that there are no joints to leak.

In order to protect such an apparatus against the possibility of explosion due to an abnormally high internal pressure—such as might result from exposure of the apparatus to the heat of a building on fire—it has been necessary to provide some sort of safety valve or rupture device. In the past, it has never been found feasible to make this rupture device an integral part of the apparatus all welded together therewith because the material of which the apparatus is constructed is ordinarily steel. In order to make a portion of this steel weak enough to constitute a rupture device, it has ordinarily been required that the steel must be so thin as to be subject to danger of rusting through, puncture etc. Consequently it has been the common practice in apparatus of this kind to make the rupture device of a disc of silver, platinum, lead or cast iron, such materials being sufficiently weaker than the steel parts of the apparatus that in case of abnormally high pressures they will rupture and prevent explosion of any of the cylinders or tubes of which the apparatus is constructed. For example, a common type of safety device in use today consists of a disc of silver about .003" in thickness clamped between two steel rings. Frequent trouble has been experienced with this type of device, however, due to leaks between the silver disc and steel rings; defects in the extremely thin sheets of silver, and corrosion of the silver discs due to sulphur or other impurities present in the cooling water in which the discs are frequently immersed.

In the present invention I have provided a blow-off device for this purpose that is devoid of all screw, clamped or pressed joints, the parts being welded together. Furthermore, the device is made of the same material as the balance of the refrigerating unit, and has all parts of sufficient thickness to withstand corrosion and any knocks or bumps to which it might be subjected. In addition, the pressure at which it will operate can be accurately determined, and it can be cheaply and expeditiously manufactured so as to burst at the required pressure. In case it is desired to change the bursting pressure, this can be readily done. While in ordinary service, this type of safety device will probably never be called upon to function, nevertheless in case it is ever desired to replace the device, this is very easily done by sawing off the old one and welding a new one in its place.

As explained above, the invention is designed primarily for use in absorption refrigeration apparatus, but may be employed in many other cases where it is desired to provide a safety device to prevent the attainment of dangerously high pressures.

Advantages additional to those mentioned above will appear as I proceed to describe the invention in detail by reference to the accompanying drawings wherein several embodiments of the invention are illustrated. Fig. 1 is a central section through the present preferred form of the invention, the section being taken longitudinally of the stem and shows a part of a vessel to which the latter is connected; Fig. 2 is a plan view on a scale considerably reduced from that of Fig. 1; Fig. 3 is a section on the line 3—3 of Fig. 1, the present view being on the same scale as Fig. 2; Fig. 4 is a view, similar to Fig. 1, showing the stem ruptured, after the device has functioned; and Figs. 5, 6, 7 and 8 are sectional views of modified forms of the invention.

The invention in its present preferred form, as illustrated in Figs. 1 to 4, comprises a stem 1 having a bore 2 that opens through what may be termed the inner end of the stem and a bore 3 that opens through the outer end of the stem, the latter bore being reduced in diameter at its inner end and terminating a relatively short distance from the outer end of the bore 2, a wall 4 separating the two bores. The outer end portion of the stem is reduced in diameter to form a shoulder 5, the plane of which is spaced inwardly somewhat from the outer end of the bore 2. The reduced end of the stem is circumferentially grooved so as to reduce the wall surrounding the inner reduced end of the bore 3 thereby to effect what I shall hereinafter term a "weak zone", designated 6.

Surrounding the reduced outer end of the stem 1 is a casing that is designated generally by the reference numeral 10 and is made up of two identical sheet metal stampings 11 and 12, each consisting of a circular end wall 13 and a peripheral wall 14. The outwardly flared edges of the walls 14 are engaged with each other and are secured together as by a welded joint designated 15. The walls 13 of the casing 10 are provided with apertures of a diameter substantially equal to that of the reduced end of the stem 1 and the casing is applied to said end of the stem with its inner wall 13 bearing against the shoulder 5. The joint between said wall and the adjacent portion of the stem is welded, as indicated at 16. The portion of the stem within the casing, and more particularly that part occupying the zone of weakness 6, may be termed a strut.

A downwardly flaring collar 17, shown in the present instance as formed of sheet metal, is fitted over the outer end of the stem 1 and against the adjacent wall 13 of the casing, and where the opposite ends of the collar engage the respective parts aforesaid it is welded thereto, as indicated at 18.

The outer end of the bore 2 communicates with the interior of the casing 10 through a port 19. The vessel to which the device is shown connected is designated 20, and it has an aperture through which the inner end of the stem 1 is projected, the stem being welded to the wall of the vessel, as indicated at 21.

Pressure existing within the vessel 20, or within an apparatus or system whereof the vessel 20 forms a part, is communicated through the bore 2 and port 19 to the interior of the casing 10. When the pressure attains a predetermined high degree (anything in excess of which would prove dangerous) the casing 10 expands and imposes such a strain upon the relatively thin wall of the stem 1 within the weak zone 6 that said wall is ruptured and the severed outer end of the stem is projected outwardly through the expanding action of the casing 10 thereby to open wide the bore 3 and vent the vessel or system.

Obviously by making the wall of the stem within the weak zone 6 of greater or less thickness, either by deepening the surrounding groove or enlarging the bore, the pressure at which the device functions may be varied. It is equally clear that in lieu of grooving the stem, the same may be notched on one or more sides.

In all essential respects the form of the invention illustrated in Fig. 5 is the same as that above described. On this account I have designated the corresponding parts of the two embodiments by the same reference characters, but have added to those applied to Fig. 5 the exponent $a$. In the present case the opposed walls $13^a$ of the expansible casing $10^a$ are formed integral with the stem $1^a$, and the edges of said walls are joined by a peripheral wall $14^a$. The latter wall is applied to the former walls in the form of a cylindrical tube and its ends are welded at 150 to circumferential flanges of the walls $13^a$. Thereafter the portion of the peripheral wall between the walls $13^a$ is spun inwardly, as shown.

The operation of the present form of the invention will be readily understood because of its similarity to that of the embodiment illustrated in Figs. 1 to 4.

Figure 6:
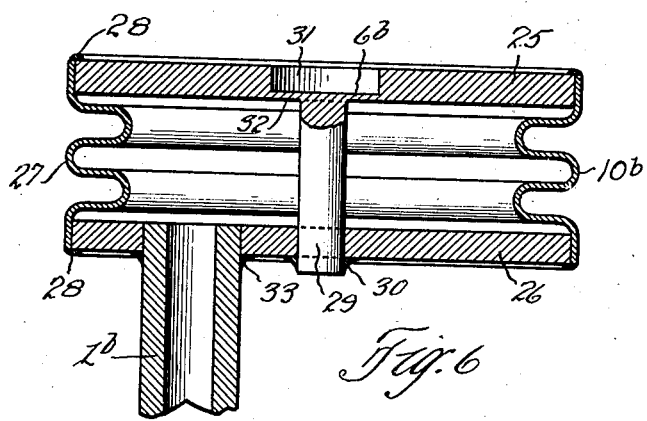

In the form of the invention illustrated in Fig. 6 the expansible casing $10^b$ comprises comparatively heavy end walls 25 and 26 whose peripheral portions are connected by a flexible metallic wall 27 that is corrugated circumferentially in the nature of an accordion or bellows to permit of ready expansion in a direction axially of the casing. The extremities of the wall 27 are welded at 28 to the walls 25 and 26. The wall 25 is provided with an axial stud 29 whose end is projected through a central aperture in the wall 26, and where the stud protrudes beyond the wall 26 it is welded thereto, as shown at 30. A relatively deep, central depression 31 is formed in the outer surface of the wall 25, and the same is of somewhat larger diameter than the stud 29 so that a comparatively thin web 32 connects the stud to the surrounding thick portion of said wall. It is the web 32, in the present case, that provides the zone of weakness, designated $6^b$. Pressure fluid is admitted to the casing $10^b$ through a tube $1^b$ that has its outer end engaged within a hole in the wall 26 and is welded to said wall at 33.

Figure 7:
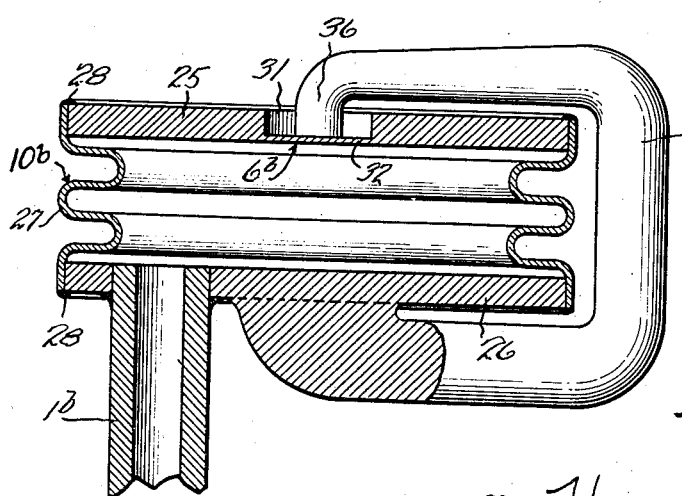

The only particular in which the form of the invention illustrated in Fig. 7 differs from that shown in Fig. 6 is the substitution of an external C-shaped bracket 35 in the later modification for the internal stud 29 of the previously described form. The remaining elements of the two modifications are the same and are designated by like reference characters. The bracket 35 is shown as formed integral with the wall 26 and as extending from the central portion of said wall about the edge of the casing and over the wall 25 where its inturned end 36 engages the central portion of the relatively thin web 32 that constitutes the bottom wall of the depression 31.

Figure 8:
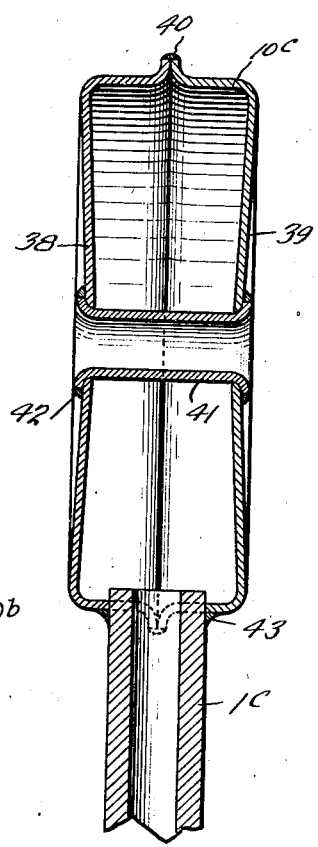

In the form of the invention illustrated in Fig. 8, the expansible casing 10ᶜ is made up of two identical sheet metal stampings 38 and 39 practically the same as those that constitute the casing 10 in the first described form of the invention. The stampings are in the nature of shallow cups whose outwardly flared perimeters are welded together at 40. A sleeve or tube 41 is disposed axially of the casing and its ends are projected through central openings in the opposed circular walls of the casing outwardly beyond which they are flared and welded to said walls, as indicated at 42. The peripheral wall of the casing has an aperture through which is engaged the end of a tube 1ᶜ through which pressure fluid is admitted to the casing, and the joint between said tube and casing is welded at 43. In the present case the sleeve or tube 41 breaks when the casing is expanded sufficiently to effect that result by abnormally high internal pressure.

Having thus decribed my invention, what I claim and desire to secure by Letters Patent is:

1. A safety blow-off device comprising a flexible wall enclosing a pressure chamber, means being provided for admitting pressure fluid to said chamber, and a vent conduit having a normally closed part exposed to the interior of the chamber, portions of said conduit on opposite sides of said part being fixed, respectively, to said wall and against movement with respect thereto whereby when said wall is flexed by abnormally high internal pressure and a strain is thus imposed upon the aforesaid part of the conduit, said part will rupture and vent the casing.

2. A safety blow-off device comprising a flexible wall enclosing a pressure chamber, means being provided for admitting pressure fluid to said chamber, and a vent conduit having a relatively weak zone exposed to the interior of the chamber, said conduit having portions on opposite sides of said zone that are fixed, respectively, to said wall and against movement with respect thereto whereby when said wall is flexed by abnormally high internal pressure and a strain is thus imposed upon the conduit in the region of said zone, the conduit will rupture and vent the casing.

3. A safety blow-off device comprising, in combination, a stem having a relatively weak zone intermediate its ends, and an expansible casing surrounding the stem and having walls spaced longitudinally of and secured to said stem on opposite sides of said weak zone, the stem having a passageway at one end that opens interiorly and exteriorly of the casing, and a passageway at the other end that opens exteriorly of the casing, and terminates at its inner end within the region of the weak zone.

4. A safety blow-off device comprising, in combination, a stem having a relatively weak zone intermediate its ends and a bore extending from one of its ends into the region of said zone, and an expansible casing enclosing a pressure chamber and surrounding the stem, opposed walls of the casing being secured to said stem beyond the opposite ends of said weak zone, the stem having also a bore extending from its opposite end and terminating short of said zone, and having also a port through which the last mentioned bore communicates with the pressure chamber.

5. A safety blow-off device comprising, in combination, a stem having an exterior shoulder intermediate its ends, an annular casing having aligned apertures in its opposed walls engaged over the stem with one of said walls bearing upon said shoulder, means forming a fluid tight joint between said walls and the stem and securing the former to the latter, the stem having a relatively weak zone intermediate its points of connection with said walls, and having also a passageway in one of its end portions extending from the interior to the exterior of said casing and a passageway in its opposite end portion opening exteriorly of the casing and extending to within the region of said weak zone.

6. A safety blow-off device comprising, in combination, a stem having an external shoulder intermediate its ends, and an annular casing having aligned apertures in its opposed walls, one end portion of the stem beyond said shoulder extending through said apertures while one wall of the casing engages said shoulder, means sealing the joints between said walls and the adjacent portions of the stem and securing the former to the latter, a bore extending from one end of the stem to a point beyond the plane of the adjacent wall of the casing, the stem having a port through which said bore communicates with the interior of the casing, the stem having a bore extending from its opposite end to within a short distance of the former bore, the stem in the region of the inner end of the latter bore being reduced in thickness and thereby weakened.

7. A safety blow-off device comprising, in combination, a stem having an external shoulder intermediate its ends, an annular casing made up of opposed dished sheet metal members, the perimeters of said members being secured together with a leak-proof joint, the opposed walls of the casing having aligned apertures for the reception of the stem, one of the walls bearing upon the aforesaid shoulder, the joints between the casing and the stem being welded, the stem having a weak zone within the casing and being provided with passageways in its opposite end portions, one of said passageways opening interiorly and exteriorly of the casing, and the other opening exteriorly of the casing and extending to within the region of said weak zone.

8. A safety blow-off device comprising, in combination, a stem reduced in diameter throughout one of its end portions thereby to provide an external shoulder, an annular casing made up of opposed dished sheet metal members, the perimeters of said members being welded together, the opposed walls of the casing having aligned apertures for the reception of the reduced end portion of the stem, one of the walls bearing upon the aforesaid shoulder, a collar surrounding the reduced end portion of the stem where it protrudes beyond the opposite wall of the casing, the joints between the casing and the stem adjacent the aforesaid shoulder, and the joints between the opposite ends of said collar and the stem and casing, respectively, being welded, the stem having a circumferential groove within the casing and a bore extending from its end of smaller diameter to within the region of said groove, the stem having also a bore extending from its opposite end to a point beyond the plane of said shoulder, and a port leading from said bore to the interior of the casing.

9. A safety blow-off device comprising a stem having a normally closed exhaust passageway, and an expansible casing mounted on the stem, the stem having also a passageway through which pressure fluid is conveyed to the casing, the casing acting when expanded by abnormally high internal pressure to open the exhaust passageway.

10. A safety blow-off device comprising an expansible casing, means for admitting pressure fluid to the casing, a strut tying together two of the walls of the casing, said strut having a bore in communication with the outside of the casing but not with the inside, the casing acting when expanded by abnormally high internal pressure to break the strut thus putting the bore of the strut into communication with the inside of the casing.

11. A safety blow-off device comprising a flexible wall casing, means admitting pressure fluid to the casing, a member arranged to resist the flexing of the casing, a part of said member being so proportioned that it will break if the pressure within the casing exceeds a predetermined maximum, said part when broken affording communication between the inside and the outside of the casing.

12. A safety blow-off device comprising an expansible casing, means admitting pressure fluid to the casing, and means resisting expansion of the casing and functioning when its resisting power is exceeded by the pressure inside the casing to create a rupture through which the casing is vented.

13. A safety blow-off device comprising an expansible casing, means admitting pressure fluid to the casing, and means resisting expansion of the casing and serving, when the casing is expanded due to abnormal internal pressure, to create a rupture through which the casing is vented.

In testimony whereof, I hereunto affix my signature.

MARC RESEK.